United States Patent [19]

Franklin

[11] Patent Number: 5,775,111
[45] Date of Patent: Jul. 7, 1998

[54] PORTABLE ICE AND $CO_2$ SNOW MAKER AND METHOD THEREFOR

[76] Inventor: Paul R. Franklin, 5211 W. Beaver St., Jacksonville, Fla. 32254

[21] Appl. No.: 738,116

[22] Filed: Oct. 25, 1996

[51] Int. Cl.[6] ...................................................... F25C 3/00
[52] U.S. Cl. ..................... 62/74; 62/388; 239/2.2; 239/418
[58] Field of Search ........................... 62/384, 388, 385, 62/74, 347; 239/2.2, 418, 433

[56] References Cited

U.S. PATENT DOCUMENTS

| | | | |
|---|---|---|---|
| 2,893,216 | 7/1959 | Seefeldt et al. | 62/384 |
| 3,214,928 | 11/1965 | Oberdorfer | 62/384 |
| 3,561,226 | 2/1971 | Rubin | 62/388 |
| 3,762,176 | 10/1973 | Coggins, Jr. | 62/74 |
| 4,166,364 | 9/1979 | Ruprecht et al. | 62/384 |
| 4,399,658 | 8/1983 | Nielsen | 62/388 |
| 4,404,818 | 9/1983 | Franklin, Jr. | 62/384 |
| 5,154,064 | 10/1992 | Franklin | 62/59 |
| 5,295,368 | 3/1994 | Franklin | 62/307 |
| 5,505,055 | 4/1996 | Franklin, Jr. | 62/74 |

*Primary Examiner*—William E. Tapolcai
*Attorney, Agent, or Firm*—Jacobson, Price, Holman & Stern, PLLC

[57] ABSTRACT

A portable apparatus and method for discharge of $CO_2$ snow or a combination of $CO_2$ and ice along a generally horizontal path over and onto a load within an elongated insulated container from one partially open end of the container toward the other closed end thereof and in a manner to form either a blanket of $CO_2$ snow or a blanket of ice over the load within the container. The apparatus includes a rectangular or cylindrical duct into which liquid $CO_2$ is discharged adjacent one closed end for impact against the walls of the duct before exiting in a $CO_2$ snow and gas stream from the opposite open end. A transverse manifold is mounted adjacent the open end to jet spray water feed to the manifold into contact with the $CO_2$ stream at an acute angle, preferably about 15°.

22 Claims, 2 Drawing Sheets

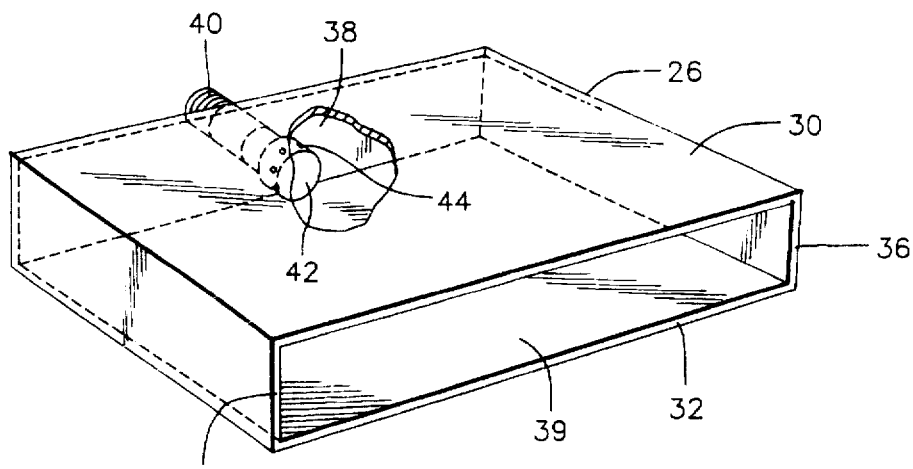
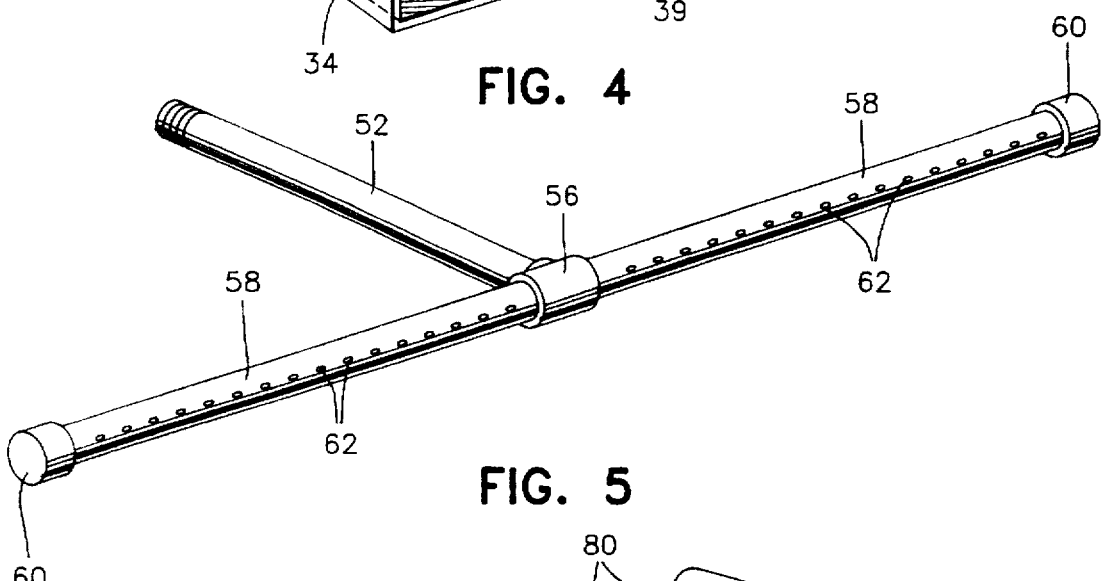
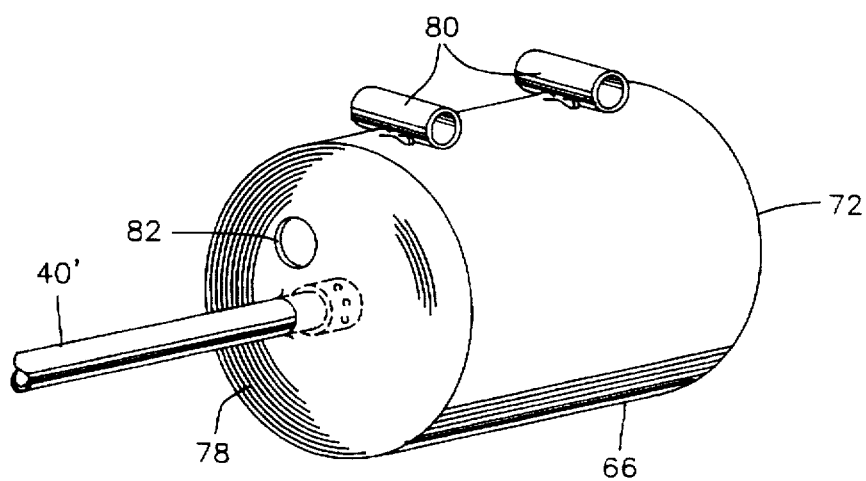

PORTABLE ICE AND CO₂ SNOW MAKER AND METHOD THEREFOR

FIELD OF THE INVENTION

This invention relates to a portable apparatus and method for spray jet discharging water into a high speed flow discharge of $CO_2$ snow at an acute angle relative thereto in order to produce ice which may vary in temperature from −50° F. to 32° F., depending upon the relative rates of spray discharge of water and flow discharge of $CO_2$ snow.

DESCRIPTION OF RELATED ART

Various different apparatuses and methods for forming ice by mixing $CO_2$ and water heretofore have been known. Examples of these previous apparatuses and methods are disclosed in my prior U.S. Pat. Nos. 5,154,064, 5,295,368 and 5,505,055.

However, without sophisticated temperature actuated flow controls the combined eductor and discharge pipes of the apparatuses disclosed in U.S. Pat. Nos. 5,154,064 and 5,295,368 are subject to clogging by freezing and therefore possible rupture by over pressurizing. Further, the container ceiling mounted liquid $CO_2$ and water spray header disclosed in U.S. Pat. No. 5,505,055 is intended to be permanently mounted in an associated insulated container and thus raises the costs of each such insulated container. In addition, such ceiling mounting constitutes an overhead obstruction to fork truck loading of such an insulated container.

SUMMARY OF THE INVENTION

The portable apparatus of the instant invention is capable of producing and projecting a high speed flow of $CO_2$ snow or producing and projecting a high speed discharge of ice. Further, the apparatus may be temporarily supported within the rear of a loaded container upon the load therein, and utilized to form either a blanket of $CO_2$ snow over the load within the container or a blanket of ice over the load in the container. In addition, if a blanket of ice is to be provided, the ice formed may range from between −50° F. and 32° F. Further, the apparatus of the instant invention is not subject to clogging.

In accordance with the present invention, the spray and flow discharges of water and $CO_2$ snow from the portable apparatus are merged into each other at an acute included angle. As such, a combined high speed discharge is formed which is capable of traveling up to approximately 50 feet and the adjustable temperature ice formed in the combined discharge may therefore be projected to the forward end of a conventional insulated container body from the rear end thereof, such container body comprising a shipping container or the body of a semitrailer, or the like.

Also, in order to form a blanket of ice over a cargo load packet within an insulated container through utilization of an ice making apparatus of the type of the instant invention, substantially all of the ambient atmosphere originally within the container must first be purged from the container and substantially fully replaced by an atmosphere of chilled $CO_2$ gas at a temperature below 32° F. This purging of the ambient atmosphere originally within the container is readily carried out by the apparatus of the instant invention by initially discharging $CO_2$ only, for approximately 10 seconds and then initiating the spray discharge of water, if desired.

The initial high speed discharge of $CO_2$ quickly purges the original ambient atmosphere from within the associated container and replaces that atmosphere with chilled $CO_2$ gas and snow. If the container being charged with ice or $CO_2$ snow comprises the body of a semitrailer including a pair of rear doors, one of the rear doors is maintained closed and the other rear door is maintained ajar in order to vent the interior of the container as $CO_2$, or a combination of $CO_2$ and water, is spray discharged into the container.

It is therefore a principal object of this invention to provide a portable apparatus which will be capable of charging the interior of an insulated container or the like with $CO_2$ snow or, alternatively, ice.

A further object of this invention is to provide an apparatus which may be handled by a single workperson.

Another object of this invention is to provide an apparatus in accordance with the preceding objects and which will be capable of varying the temperature of the charge of ice introduced into the associated container.

Another object of this invention is to provide an apparatus in accordance with the preceding objects which may be readily handled, properly positioned and operated by even unskilled persons for the purpose of charging the interior of a container with $CO_2$ snow or ice at a predetermined temperature.

Another object of this invention is to provide an apparatus which may be utilized to quickly charge the interior of an insulated shipping container or insulated trailer body with $CO_2$, or ice at a predetermined temperature, at any location in which a supply of ambient temperature water and refrigerated liquid $CO_2$ is available.

A final object of this invention to be specifically recited herein is to provide an apparatus and method in accordance with the preceding objects and which will conform to conventional forms of manufacture, be of simple construction and easy to use so to provide a device and method that will be economically feasible, long lasting and relatively trouble free in operation.

These together with other objects and advantages which will become subsequently apparent in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a perspective view of the duct portion of the invention with the manifold portion removed and portions of the top wall of the duct portion broken away and illustrated in vertical section.

FIG. 4 is a perspective view of the manifold portion of the instant invention.

FIG. 5 is a perspective view of a modified form of apparatus, with the manifold portion thereof removed, utilizing a cylindrical duct portion as opposed to a rectangular duct portion.

DESCRIPTION OF THE PREFERRED EMBODIMENTS

Figure 1:
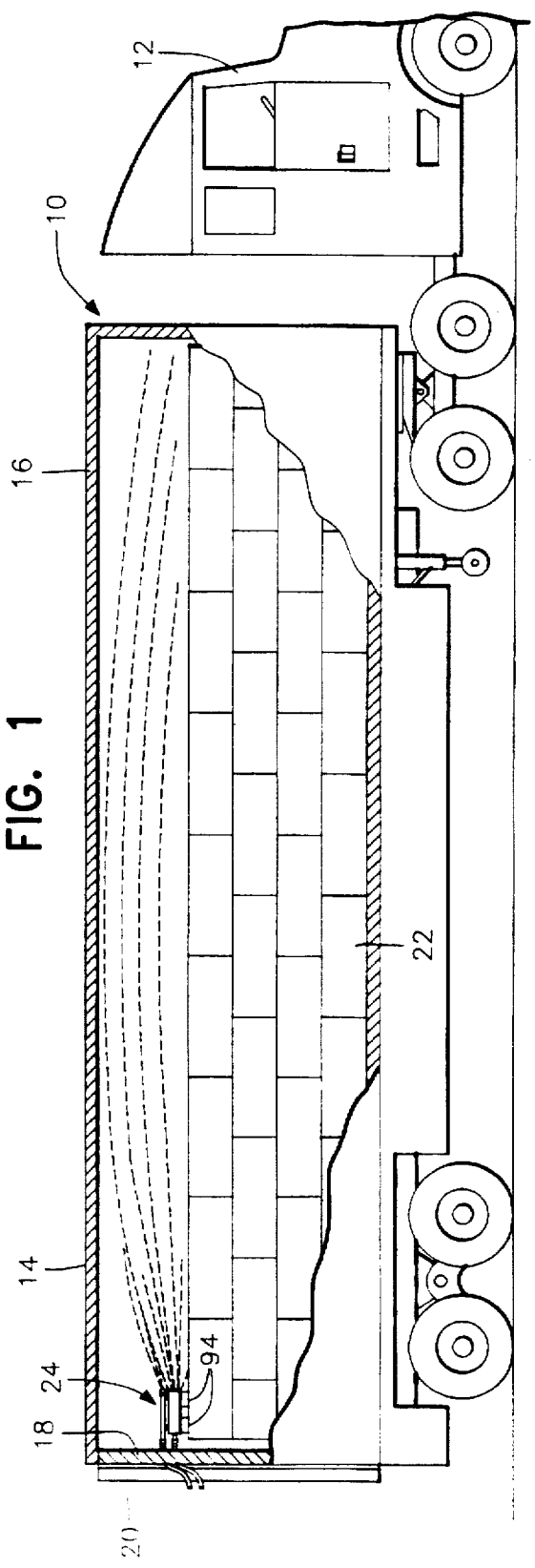
FIG. 1 is a fragmentary side elevational view of a tractor and semitrailer combination illustrating the apparatus of the instant invention within the rear of the semitrailer body and in operation forming a layer of refrigerated snow and/or ice over a load within the semitrailer, portions of the semitrailer being broken away and illustrated in vertical section.

Referring now more specifically to FIG. 1 of the drawings, the numeral 10 generally designates a tractor and semitrailer combination including a tractor 12 and semitrailer 14. The semitrailer 14 includes insulated walls 16 and a pair of insulated rear doors 18 and 20. The semitrailer 14 may be used to transport refrigerated or frozen loads such as the box load 22 stacked therein.

If the box load 22 comprises boxes of refrigerated food stuffs or the like, it is desired to form a blanket of 32° F. ice over the load 22. On the other hand, if the box load 22 comprises frozen material, it is desirable to form a blanket of ice over the load 22 with the ice perhaps 0° F. or lower in temperature. Alternatively, it may be desirable to form a blanket of $CO_2$ snow over the box load 22.

In order to form either a $CO_2$ blanket or an ice blanket over the load 22, the apparatus 24 of the instant invention can be utilized. The apparatus 24 includes a housing or duct 26 and a transverse water spray manifold 28 mounted from the housing 26, preferably at the top as shown. The housing 26 includes top and bottom walls 30 and 32 interconnected by opposite side walls 34 and 36 and a rear wall 38 extending between the side walls 34 and 36. Thus, the rear of the housing 26 is closed by the rear wall 38 while the front of the housing 26 remains open as at 39.

Figure 2:
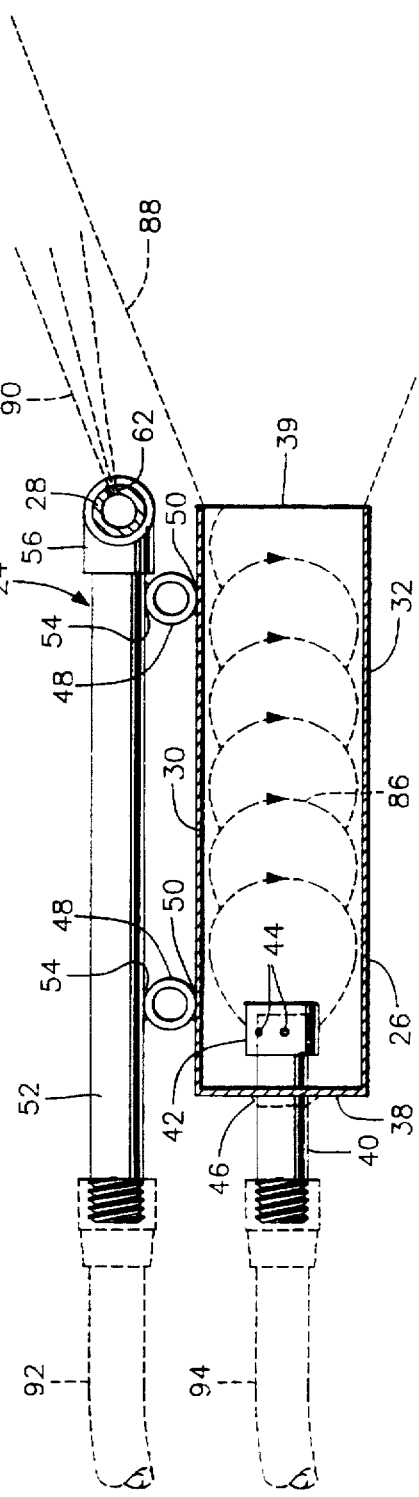
FIG. 2 is an enlarged fragmentary longitudinal vertical sectional view of the apparatus of the instant invention illustrating the manner in which a high speed discharge of $CO_2$ snow and gas is discharged from the duct portion and multiple spray discharges of water are discharged from holes in the transverse manifold portion.

In a preferred form of the invention, the housing 26 or duct, see FIGS. 2 and 3, is about 10 inches long, about 16 inches wide and about 3 inches high. Pipe 40, preferably 1 inch stainless steel, opens centrally through the rear wall 38 and is capped at its forward end by cap 42, also preferably made of stainless steel. As shown in FIGS. 2, 3 and 5, the cap 42 includes preferably 6 equally circumferentially spaced radial outlet jet holes 44 formed therein spaced approximately 1 inch forward of the rear wall 38 and the pipe 40 is sealingly attached to the rear wall 38, by welding as at 46 or the like. The radial jet holes are aligned nearly perpendicular to the longitudinal center line of the duct, preferably angled slightly toward the open end of the duct.

The top wall 30 of the stainless steel duct or housing 26 has a pair of spaced support elements, such as short transverse pipe sections 48, secured to the outer surface thereof by welding 50 or the like. A water feed pipe 52 extends longitudinally of the duct 26 and is supported from the pipe sections 48 by welding 54 or the like. The pipe 52 is preferably located along the longitudinal center plane of duct 26 between the pipe sections 48, thus defining a hand grip by which the portable apparatus 24 may be readily transported.

The forward end of the water feed pipe 52, see FIGS. 2 and 4, includes a T-fitting 56 supported therefrom and a pair of manifold pipe sections 58 supported and projecting in opposite directions from the T-fitting 56. The remote ends of the manifold pipe sections 58 are capped as at 60. In addition, each of the manifold pipe sections 58 includes a series of spray jet holes 62 opening outwardly in a plane which is inclined upwardly preferably about 15° from a horizontal plane coincident to the longitudinal center line of the water feed pipe 52. In the preferred embodiment, the transverse manifold including the T-fitting 56 and the pipe sections 58 is about 42 inches in length. As designed in the preferred embodiment, the jet holes 62 are positioned to spray discharge jets of water at an upwardly inclined angle of about 15° relative to the horizontal when the duct 26 and water feed pipe 52 are horizontally disposed. As shown in FIG. 4, there are sixteen holes 62 in each section 58 spaced about 1 inch apart although the number of holes 62 may be varied according to the size and cross-sectionally shape of the duct 16.

At present, and for discharging $CO_2$ snow and/or ice over the load 22 whose upper height is closely spaced below the top wall of the semitrailer 14, a duct which has a rectangular cross-section has been found to be most desirable. Such a rectangular cross-sectional duct renders a high speed discharge of $CO_2$ snow and gas therefrom when liquid $CO_2$ is discharged under high pressure from the jet holes 44. However, as may be seen from FIG. 5, a cylindrical duct 66 may be used in place of the rectangular duct 26. Cylindrical duct 66 includes an open end 72 and a rear end closed by a hemispherical end wall 78 through which pipe 40' corresponding to the pipe 40 may open. In addition, the cylindrical duct 66 has a pair of pipe sections 80 for support elements which correspond to the pipe sections 48 previously described. Of course, a manifold similar to that formed by the pipe 52 and pipe sections 58 is to be mounted on the pipe sections 80.

In order to prevent clogging of the interior of the cylindrical duct 66 with $CO_2$ snow, the hemispherical rear wall 78 is preferably provided with a vent opening 82, having a size in the preferred embodiment of about 1½ inch diameter. For reasons not fully understood, the high pressure discharge of liquid $CO_2$ from the jet holes 44 in the rectangular duct 26 causes a swirling flow of $CO_2$ snow and gas, as indicated by the numeral 86, about the longitudinal centerline of the duct 66 to move forward rapidly through the duct 26 and outwardly through the open end 39 thereof along a diverging flow stream 88 without clogging the interior of the duct 26 with snow. On the other hand, when a cylindrical duct such as duct 66 is utilized without the vent opening 82 in the back wall thereof, the cylindrical duct tends to clog with $CO_2$ snow. The inclusion of the vent opening 82 closely adjacent the pipe 40' has been found to eliminate such clogging.

The six jet holes 44 are preferably about ⅛ inch in diameter and the jet holes 62 are about 0.043 in diameter. The jet holes 62, at 60 psi, discharge about ½ gallon of water per minute for every three jet holes 62, and the six jet holes 44 together deliver approximately 192 pounds of liquid $CO_2$ per minute at 0° F. However, these rates of flow can be varied depending upon the pressure applied and the size openings utilized.

If only liquid $CO_2$ is discharged from the apparatus 24, $CO_2$ snow at a temperature of approximately −110° F. is projected over the entire length of the interior of the semitrailer 14 up to about 50 feet in the preferred form of the present invention. However, when spray jet holes 62 also are used to discharge spray jets of water of approximately 70° F., the divergent flow stream 90 (FIG. 2) of fine droplets of water merges with the divergent flow stream of $CO_2$ snow and gas being discharged from the duct 26 at an acute angle relative thereto and the water is quickly transformed into ice at a temperature ranging between −50° F. to 32° F., depending upon the relative rates of discharge of water and liquid $CO_2$.

Water at a normal water temperature of approximately 70° F. is supplied to the pipe 52 through any standard water supply hose 92, and liquid $CO_2$ at 0° F. is supplied to the pipe 40 through a conventional $CO_2$ hose 94. The hoses 92 and 94 preferably pass between the closed door 18 and the slightly ajar door 20 and positively prevent the door 20 from being closed, thus maintaining the interior of the semitrailer vented. While pipe 40 to duct 26 and water feed pipe 52 are shown with male connectors, they could equally be provided with female connectors to connect with male connectors on supply hoses 92 and 94.

For operation, the portable apparatus 24 may be placed upon the upper portion of the rear of the load 22 on 2×4's 94 or the like. Upon initial operation of the apparatus 24, only liquid $CO_2$ is discharged from the spray jets 44 over a period of approximately 10 seconds. This initial 10 second discharge of $CO_2$ within the semitrailer 14 will quickly purge the original atmosphere from within the semitrailer 14 and replace that original atmosphere with a dry atmosphere of $CO_2$ gas below 32° F. Then, when water jets 90 are spray discharged from the jet holes 62, it is rapidly transformed into ice as a result of the chilled dry atmosphere within the semitrailer 14 and contact with flow stream 88 where flow streams 88 and 90 merge at an acute angle relative to each other.

While operation of the preferred embodiment has herein previously been described using domestic tap water at ambient temperature and about 60 psi, it has been found that if the pressure of water supplied to the pipe 52 is increased by the use of a pump (not shown) to approximately 100 psi, with no other changes to the apparatus 24, the amount of ice produced and projected over the box load 22 is increased by generally 50%. This is believed to be a result of the greater pressure of water passing through the holes 62 being transformed into finer droplets of water which are more readily frozen. Also, while a greater pressure of water is being utilized, the distance the water is cast from the manifold pipe sections 58 is generally the same since the finer droplets of water are lighter in weight.

Further, if the height of the box load 22 is lower, thus leaving more clearance between the top of the box load 22 and the ceiling of the semitrailer 14, the holes 62 may be inclined upwardly as much as about 25°. Also, the holes 62 may generally parallel the longitudinal center plane of duct 26 and the duct 26 may be mounted generally as shown in FIG. 1, but in an upwardly inclined position.

However, since the $CO_2$ gas and snow being discharged from the duct 26 diverge more than the divergent flow stream jets of water being discharged from the holes 62, it has been found that a blanket of ice having a more even thickness can be formed over the box load 22 if the duct 26 is generally horizontal and the holes 62 are upwardly inclined generally about 15°. This enables the fine droplets of water more time in direct contact with the $CO_2$ gas and snow being discharged from the duct 26 while maintaining a combined spray or flow discharge of approximately 50 feet in length.

From the foregoing it may be understood that the interior of the semitrailer 14 is initially provided with the refrigerated box load 22 through the utilization of a fork lift truck or the like. Inasmuch as the apparatus 24 includes no part thereof within the semitrailer 24 at the time it is being loaded, the apparatus 14 does not interfere with the loading of the trailer.

As hereinbefore set forth, the box load 22 may be either a refrigerated load or a frozen load and after loading of the semitrailer 14 has been completed, the portable apparatus 24 may be set up and operated to form a blanket of ice or $CO_2$ snow over the load 22 while the rear door 20 is ajar. Of course, after the blanket of ice or $CO_2$ snow has been formed over the load 22, the apparatus 24 is removed and the door 20 is closed, the semitrailer 14 including at least some means (not shown) for venting excess pressure from within the closed semitrailer 14 as the $CO_2$ vaporizes.

It is also pointed out that while six radial outlet jet holes 44 are illustrated and described, it is possible to use as few as three radial outlet jets 44, or more than six. Further, the pressure of water supplied to the jets 62 determines, at least somewhat, the size of the ice pieces being formed.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A portable apparatus for forming a blanket of ice and $CO_2$ snow over an elongated load within an elongated container at least partially open at one end thereof, which comprises an elongated duct having a first closed end and a second open end, liquid $CO_2$ discharge structure in said closed end located generally centrally transversely therein and operative to discharge at least three generally equally angularly displaced spray jets of liquid $CO_2$ therefrom toward and for impact with opposing inner surfaces of said duct and produce a $CO_2$ stream exiting said duct open end and water spray discharge structure mounted adjacent said open end and operative to discharge spray jets of water outwardly therefrom along a path transverse to a first direction in which said open end opens and in a second direction generally paralleling said first direction such that said water spray jets merge with said $CO_2$ stream exiting said duct open end.

2. The apparatus of claim 1 wherein said liquid $CO_2$ discharge structure is operative to discharge six generally equally angularly displaced spray jets of liquid $CO_2$ outwardly therefrom toward and for impact with opposing inner surfaces of said duct.

3. The apparatus of claim 1 wherein said duct is generally rectangular in shape.

4. The apparatus of claim 1 wherein said duct is generally cylindrical shape and said closed end is closed by a generally circular end wall, said end wall having a vent opening therein to avoid clogging of said duct with $CO_2$ snow.

5. The apparatus of claim 1 wherein said second direction for said discharge water spray jets diverges from said first direction at an angle between 0° and about 25°.

6. The apparatus of claim 5 wherein said diverging angle is about 15°.

7. An apparatus for forming a blanket of ice and $CO_2$ snow over a load comprising a $CO_2$ snow discharge structure that includes an elongated duct having a longitudinal axis extending in a first direction and having an open end for projecting outwardly a stream of $CO_2$ generally in said first direction and a water spray discharge structure mounted adjacent said open end and operative to project a discharge of water spray jets outwardly therefrom along a path in a second direction at an angle divergent from said first direction which said open end opens to merge said water spray jets with said $CO_2$ stream along said first direction.

8. An apparatus of claim 1 wherein said water spray discharge structure includes a plurality of spray jet openings spaced along a generally straight path disposed transverse to said first direction and operative to discharge fine water spray jets outwardly from said straight path in said second direction.

9. An apparatus for forming a high speed flow discharge of $CO_2$ snow which comprises an elongated duct having a longitudinal axis and a first closed end and a second open end, a liquid $CO_2$ discharge structure in said closed end located generally transversely centrally therein and operative to discharge at least three generally equally angularly displaced radial spray jets of liquid $CO_2$ therefrom in a direction generally perpendicular to said longitudinal axis for impact with opposing inner surfaces of said duct.

10. The apparatus of claim 9 wherein said liquid $CO_2$ discharge structure is operative to discharge six generally equally angularly displaced radial spray jets of liquid $CO_2$ outwardly therefrom for impact with the opposing inner surfaces of said duct.

11. The apparatus of claim 10 wherein said duct is generally rectangular in shape.

12. The apparatus of claim 10 wherein said duct is generally circular in cross sectional shape and said closed end is closed by a generally hemispherical end wall, said end wall having a vent opening therein to avoid clogging of said duct with $CO_2$ snow.

13. The apparatus of claim 9 including water spray jet discharge structure including a plurality of spray jets spaced along a generally straight path disposed transverse to said open end adjacent the latter and operative to discharge fine spray jets of water outwardly from said path in generally the same direction in which said open end opens.

14. The apparatus of claim 13 wherein said duct is generally rectangular in shape.

15. The apparatus of claim 13 wherein said duct is generally circular in cross sectional shape and said closed end is closed by a generally hemispherical end wall, said end wall having a vent opening therein to avoid clogging of said duct with $CO_2$ snow.

16. The method of forming and projecting $CO_2$ snow into a closed, but vented, storage container, said method comprising providing an elongated duct having a first closed and a second open end opening into said container, spray discharging liquid $CO_2$ into said first closed end from a substantially transverse central area therein and in at least three generally equally angularly displaced, radial outward directions toward and for impact with opposing inner surfaces of said duct and with the rate of discharge of liquid $CO_2$ into said first end in relation to the cross sectional area of said duct being sufficient to effect a high speed swirling flow discharge of $CO_2$ snow and $CO_2$ gas from said open end.

17. The method of claim 16 including spray discharging a plurality of jets of water into said high speed flow discharge from laterally outwardly thereof and at an acute angle thereto, whereby to form a high speed discharge of ice in the general direction in which said open end opens.

18. The method of claim 16 wherein said duct is generally rectangular in cross section and said flow discharge is caused to swirl about the longitudinal centerline of said duct at said open end as said high speed flow discharges exits said open end in a diverging manner.

19. The method of claim 17 wherein said plurality of spray jets are spaced along a generally straight path disposed transverse to said flow discharge.

20. The method of claim 17 wherein said duct is cylindrical in cross section and said closed end is closed by a generally hemispherical end wall toward whose inner surfaces said liquid $CO_2$ sprays are directed, said generally hemispherical end wall including a vent opening therein.

21. The method of claim 16 wherein said container is elongated and said second open end opens into one end of said container toward the other end thereof.

22. The method of claim 21 wherein said other end of said container is closed and said one end thereof is closable by means of a pair of horizontally swinging doors, one of said doors being closed and the other of said doors being ajar.

* * * * *